United States Patent
Hao et al.

(10) Patent No.: US 7,932,906 B2
(45) Date of Patent: Apr. 26, 2011

(54) CONSTRUCTING SUBSTANTIALLY EQUAL-WIDTH PIXEL BAR CHARTS TO ENABLE VISUAL DATA ANALYSIS

(75) Inventors: Ming C. Hao, Palo Alto, CA (US); Umeshwar Dayal, Saratoga, CA (US); Klaus Wurster, Austin, TX (US); Peter Wright, Woodstock, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1413 days.

(21) Appl. No.: 10/941,114

(22) Filed: Sep. 15, 2004

(65) Prior Publication Data

US 2006/0059439 A1 Mar. 16, 2006

(51) Int. Cl.
G09G 5/00 (2006.01)
G06T 11/20 (2006.01)

(52) U.S. Cl. .............. 345/440; 345/440.1; 345/440.2; 345/441; 345/442; 345/619; 715/700; 715/788

(58) Field of Classification Search ....... 345/440–440.1, 345/440.2, 441, 442, 619; 715/700, 788
See application file for complete search history.

(56) References Cited

U.S. PATENT DOCUMENTS

| | | | | |
|---|---|---|---|---|
| 5,801,688 A * | 9/1998 | Mead et al. | ............... | 715/700 |
| 5,815,072 A | 9/1998 | Yamanaka et al. | ............... | 340/461 |
| 5,893,090 A * | 4/1999 | Friedman et al. | ............... | 707/3 |
| 5,929,863 A * | 7/1999 | Tabei et al. | ............... | 345/440 |
| 5,970,466 A | 10/1999 | Detjen et al. | ............... | 705/8 |
| 6,021,404 A | 2/2000 | Moukheibir | ............... | 706/46 |
| 6,247,004 B1 | 6/2001 | Moukheibir | ............... | 706/46 |
| 6,400,366 B1 * | 6/2002 | Davies et al. | ............... | 345/440 |
| 2002/0177756 A1 | 11/2002 | Pierre Godinot et al. | ........ | 600/300 |
| 2003/0071815 A1 | 4/2003 | Hao et al. | ............... | 345/440 |
| 2003/0225315 A1 | 12/2003 | Merrett et al. | ............... | 600/300 |

OTHER PUBLICATIONS

D. A. Keim, M.C. Hao, U. Dayal, M. Hsu, "Pixel Bar Charts: a visualization technique for very large multi-attributes data sets", Information Visualization, 2001, pp. 1-14.*
D. Keim, M. C. Hao, J. Ladisch, M. Hsu, U. Dayal, "Pixel Bar Charts: A New Technique for Visualizing Large Multi-Attribute Data Sets without Aggregation", HP Technical Report, Apr. 11, 2001, pp. 1-10.*
M. C. Hao, U. Dayal, F. Casati, "Visual mining business service using pixel bar charts", HP Technical Report, Jun. 29, 2004, pp. 1-7.*
D. Keim, M.C. Hao; U. Dayal; "Hierarchical pixel bar charts", IEEE Trans. On Visualization and Computer Graphics, vol. 8, No. 3, Jul.-Sep. 2002, pp. 255-269.*
Keim, D , et al., "Pixel bar charts: a new technique for visualizing large multi-attribute data sets without aggregation", *IEEE Symposium on Information Visualization, 2001. INFOVIS 2001*, (2001),113 -120.

* cited by examiner

*Primary Examiner* — Jin-Cheng Wang

(57) ABSTRACT

A graphical production system produces pixel bar charts, in various embodiments. In an embodiment, a pixel bar chart is constructed that may include multiple bars with substantially equal widths and potentially variable heights to enable visual data analysis. A bar may include a number of pixel units corresponding to a volume of data records represented within the bar. Selected visual indicators are displayed within the pixel units of the bar, where a selected visual indicator represents a value of an attribute of a data record represented by the pixel unit. In an embodiment, the pixel units may be ordered within a bar in a particular sequence (e.g., ascending, descending or some other order). Further, in an embodiment, the bar width is determined to minimize the amount of padding. In an embodiment, a visual indicator scale is displayed to indicate values associated with each visual indicator.

2 Claims, 8 Drawing Sheets

| | 221 | 222 | 223 | 224 | 225 | 226 |
|---|---|---|---|---|---|---|
| RECORD NUMBER | INVOICE NUMBER | CUSTOMER ID | ORDER DATE | PRODUCT ID | QUANTITY | TOTAL SALE ($) |
| 001 | 0156 | 0087 | 05/14/04 | VCR07A | 001 | 189.99 |
| 002 | 0157 | 1022 | 05/14/04 | DVD04C | 012 | 1319.88 |
| 003 | 0158 | 0451 | 05/14/04 | DVD04C | 001 | 109.99 |
| 004 | 0172 | 0087 | 05/15/04 | VCR07A | 007 | 1329.93 |
| 005 | 0172 | 0087 | 05/15/04 | FTV16 | 003 | 2099.97 |
| 006 | 0239 | 1114 | 05/18/04 | DVD04C | 047 | 5169.53 |
| 007 | 0240 | 0693 | 05/18/04 | FTV16 | 001 | 699.99 |
| 008 | 0241 | 0472 | 05/18/04 | VCR07A | 063 | 11,969.37 |
| 009 | 0242 | 0087 | 05/18/04 | FTV16 | 095 | 66,499.05 |
| 010 | 0296 | 1022 | 05/19/04 | DVD04C | 123 | 13,528.77 |

FIG. 2

CONSTRUCTING SUBSTANTIALLY EQUAL-WIDTH PIXEL BAR CHARTS TO ENABLE VISUAL DATA ANALYSIS

BACKGROUND

In the technology of information visualization, traditional bar charts are sometimes used as a vehicle for conveying visual representations of information. For example, a bar chart may be used to represent sales volumes of a particular product over a one-year period. If each bar is used to represent sales within a particular month, the sales data is partitioned into twelve groups. The height of each month's bar may represent, for example, the total sales volume (e.g., the sum of all sales) for that month. Alternatively, the height of each month's bar may represent the average sale amount or the total number of units sold within the month, for example. Either way, the sales information within a month is "aggregated," to define the height of the corresponding month's bar. No further information is typically provided, such as sales volume, sales distribution or exceptions, for example.

The above example of a bar chart indicates at least three limitations inherent in a traditional bar chart. First, by using data aggregation techniques, the values of the actual underlying data are obscured. Second, the data distributions are also obscured. Third, exceptional values (e.g., outliers) are not apparent from inspecting the bar chart.

Analysts often are faced with data analysis tasks that require detailed scrutiny of large volumes of multiple-attribute data. Because traditional bar charts are limited in the number of data attributes that they simultaneously can convey, information visualization technology developers continue to develop ways of displaying information in a manner in which large volumes of multiple data attributes may simultaneously be displayed and readily perceived.

BRIEF DESCRIPTION OF THE DRAWINGS

Like-reference numbers refer to similar items throughout the figures and:

FIG. 2 illustrates an example of multiple-attribute data records, in accordance with an embodiment;

DETAILED DESCRIPTION

Embodiments of the inventive subject matter include methods for constructing pixel bar charts. Embodiment may achieve some or all of the following advantages: 1) visualization of large amounts of multiple-attribute data in an equal-width bar chart; 2) visualization of data volume, distribution, and exceptions by applying different "visual indicators" (e.g., colors) to different pixels; 3) enabling "drill down" from a bar chart to view detailed record information (e.g., to discover and visualize data that may be causing an exceptional condition); and 4) enabling information to be represented in a manner that retains a high degree of human intuitiveness (e.g., though the intuitive nature of equal-width bar charts).

In an embodiment, all or portions of the various embodiments are carried out by a pixel bar chart generation tool, which includes a software application that may be run on a general-purpose or special-purpose computing device. The pixel bar chart generation tool creates "pixel bar charts." A pixel bar chart may present data values directly, rather than aggregating a large set of values into just a few aggregated values. A data record may be represented by one or more pixels in the bar chart. Detailed information within the data record may be encoded into the appearance of the pixel(s) (e.g., the pixels' colors, gray-scale intensities, patterns, etc.), in an embodiment. These concepts will be described in detail below.

Figure 1A:
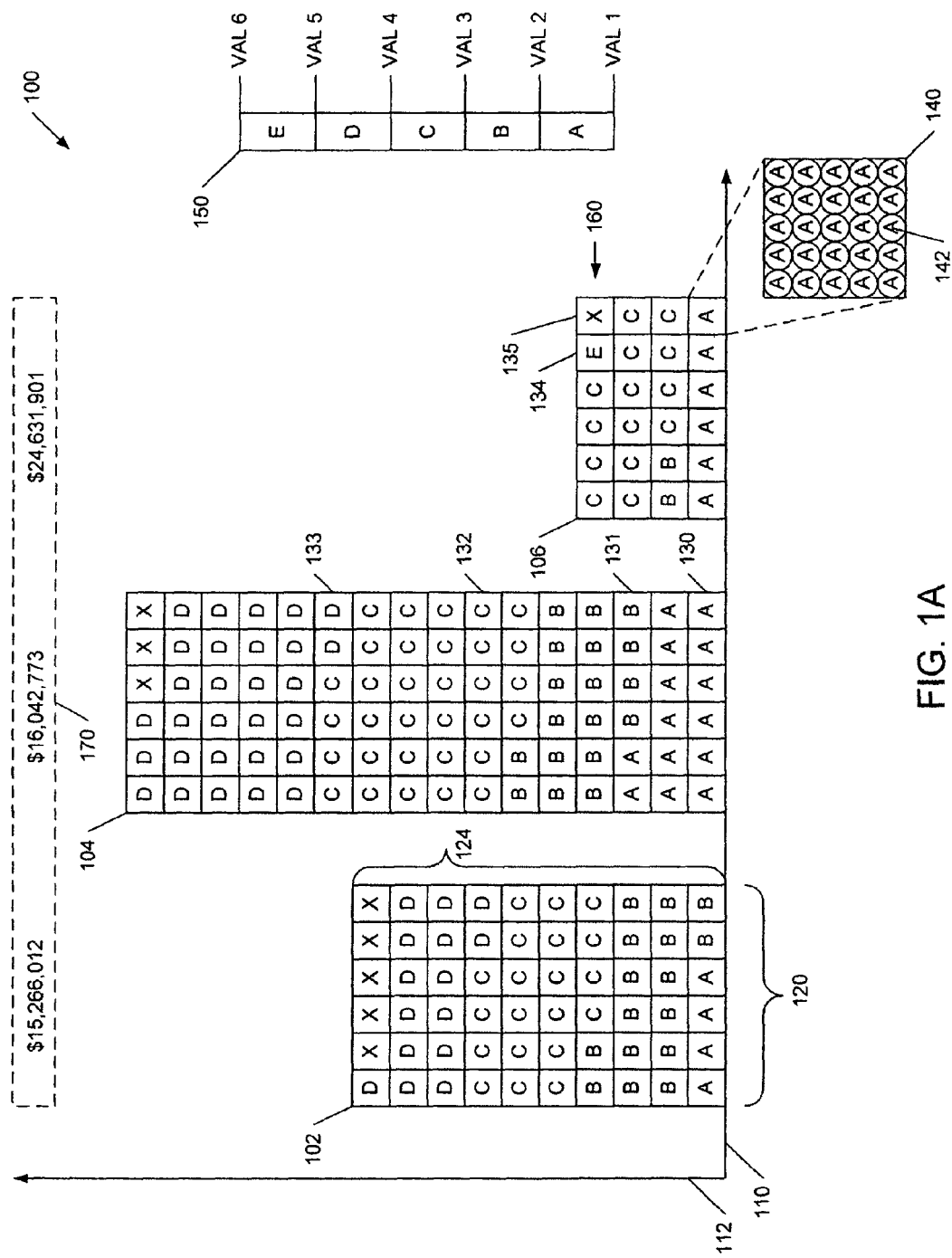
FIG. 1A is an example illustrating a pixel bar chart, in accordance with an embodiment.

FIG. 1A is an example illustrating a pixel bar chart 100, in accordance with an embodiment of the invention. Pixel bar chart 100 includes one or more "bars" 102, 104, 106, which are positioned with respect to a horizontal axis 110 and a vertical axis 112. Each bar may have a substantially equal width to other bars, but potentially variable height. The bars 102, 104, 106 correspond to a partitioning of the bar chart according to the horizontal axis 110. In an embodiment, each bar 102, 104, 106 may be considered to include representations of data within a "category," where a "category" is a value, range of values, or set of values associated with the bar. Embodiments enable visualization of categorized data (i.e., data that can be separated into one or more categories).

Each bar 102, 104, 106 includes multiple "pixel units" (e.g., pixel units 130-135). The term "pixel unit" is used herein to mean a set of one or more contiguous display pixels. For example, an enlarged pixel unit 140 is illustrated as being composed of twenty-five display pixels 142. In various embodiments, a pixel unit may be composed of as few as one display pixel or as many as hundreds of display pixels. Further, although a square pixel unit is illustrated, a pixel unit may alternatively have a rectangular shape, a different geometric shape, or an irregular shape.

A pixel unit can represent one record or multiple records, in various embodiments. If a pixel unit (e.g., pixel unit 140) is used to represent one record, then each of the display pixels 142 within the pixel unit 140 may have a consistent color (or other visual indicator). If a pixel unit 140 is used to represent multiple records, then some or all of the display pixels 142 may have different colors (or other visual indicators), or a color (or other visual indicator) may be used that indicates an aggregation of the multiple records (e.g., each display pixel 142 within the pixel unit 140 may have a color that represents an average of values within the multiple records represented by the pixel unit).

In an embodiment, bars 102, 104, 106 have substantially equal widths (e.g., width 120) as each other, and potentially variable heights (e.g., height 124). In other words, each bar (e.g., bar 102) includes substantially the same number of pixel units that define its width 120 as the numbers of pixel units defining the widths of the other bars (e.g., bars 104, 106). However, each bar (e.g., bar 102) may have a substantially different number of pixel units that define its height 124, when compared with the heights of the other bars (e.g., bars 104, 106). The height 124 of a bar indicates the volume of pixel units included in the bar, and/or the volume of records represented in the bar.

For example, first bar 102 has a width defined by six pixel units, and a height defined by ten pixel units (i.e., a total volume of 60 pixel units). In contrast, second bar 104 also has a width defined by six pixel units, but has a height defined by sixteen pixel units (i.e., a total volume of 96 pixel units). A pixel bar chart having bars with substantially the same widths and potentially different heights is referred to herein as an "equal-width pixel bar chart." It is to be understood that the term "equal-width" means that each bar includes substantially the same number of pixels or pixel units defining the width of the bar. The term "equal-width" does not mean that the widths are strictly equal (e.g., they may vary by a small number of pixels), although they may be strictly equal.

In various embodiments, as will be described in more detail below, a "visual indicator" produced within a pixel unit may be used to represent a value derived from one or more data items (e.g., sales price). In various embodiments, visual indicators may include sets of static or dynamic colors, grey-scale intensities, patterns, images, combinations thereof, and the like, which may be uniquely perceived by a person. In the illustrated example, distinct visual indicators are represented within pixel units 130-135 using alphabetic characters "A" (pixel 130), "B" (pixel 131), "C" (pixel 132), "D" (pixel 133), "E" (pixel 134), and "X" (pixel 135). For example, distinct colors may be used as the visual indicators, and color "A" may be yellow, color "B" may be green, color "C" may be blue, color "D" may be violet, and color "E" may be red. Pixel unit "X" includes a padding color, in an embodiment, which is displayed in a "padding pixel unit." A "padding pixel unit" normally occurs on a top row of a bar, when the number of data records represented in the bar is not exactly equal to a multiple of the number of pixel units in the bar width. In an embodiment, the color selected for a padding pixel unit is the same color as the highest order pixel unit.

Each visual indicator designation corresponds to a single distinct value, to a set of distinct values, or to a sub-range within a range of values, in an embodiment. A pixel "visual indicator attribute" is a type of value (e.g., a particular field within a data record) that is designated to be represented by distinct visual indicators displayed in conjunction with pixel units. The description, herein may provide examples where the visual indicators are a set of colors (e.g., a set of contiguous colors (i.e., gradually changing colors) within a contiguous color scale, or another set of non-contiguous colors). It is to be understood that other visual indicators alternatively could be used, including sets of static or dynamic grey-scale intensities, patterns, images, combinations thereof, and the like, and mentioned previously. Accordingly, the use of the terms "color" are not meant to be limiting, but are used only to simplify description of various embodiments.

Accordingly, for example, if a value corresponding to a pixel visual indicator attribute has a total range of 0-100 integer values, color "A" may pertain to a sub-range from 0-5; color "B" to sub-range 6-20; color "C" to sub-range 21-80; color "D" to sub-range 81-95; and color "E" to sub-range 96-100. In an embodiment, the set of visual indicators (e.g., the set of colors) may indicate a data distribution within a bar. Further, in an embodiment, one or more selected visual indicators may indicate exceptional values for the represented attribute. For example, a pixel unit (e.g., pixel unit 134, FIG. 1A) displaying color "E" (e.g., red) may indicate an extremely high (or low) value for the represented attribute. When one or more exceptional values occur in a category (i.e., a bar) for a traditional bar chart, the exceptional values may cause the entire bar to be higher (because the average of the represented values would be higher), thus presenting a somewhat skewed representation that may not accurately indicate the character of the rest of the non-exceptional values represented within the bar. In accordance with embodiments of the inventive subject matter, one or more exceptional values occurring within a category may be easily identifiable, using a distinct visual indicator, and the height of the bar may continue to reflect volume in a non-skewed manner. Although only five visual indicator designations are illustrated in FIG. 1A, as few as two visual indicator designations may be used or as many as hundreds of visual indicator designations may be used.

A pixel bar chart, such as the example chart of FIG. 1A, may be used to represent multiple attributes of a set of data records. The term "data record" is used herein to mean a set of defined fields, where various fields may have stored therein distinct data values.

In an embodiment, one pixel unit corresponds to one attribute (e.g., response time) in a data record. In another embodiment, one pixel unit may correspond to multiple data records for the same attribute. For simplicity sake, the description below refers to a one-to-one correlation between pixel units and data records. However, it would be apparent to one of skill in the art, based on the description herein, how to aggregate data within corresponding fields of multiple records so that one pixel unit corresponds to multiple data records for visualization of the same attribute (e.g., response time).

FIG. 2 illustrates an example of a set 200 of multiple-attribute, categorical data records 201, 202, 203, 204, 205, 206, 207, 208, 209, 210, where each record corresponds to an order received by a company, in accordance with an embodiment. The data records 201-210 will be referred to in the description, below, to illustrate various aspects of the inventive subject matter.

Each data record 201-210 includes a plurality of fields. In the given example, these fields include: "Record Number" field 220; "Invoice Number" field 221; "Customer Identification (ID)" field 222; "Order Date" field 223; "Product ID" field 224; "Quantity" field 225; and "Total Sale ($)" field 226. Although data records having specific fields are illustrated in FIG. 2, it would be apparent to one of skill in the art, based on the description herein, how to apply embodiments of the inventive subject matter to other types of data records having other fields.

In addition, although an example is used that pertains to a company's ordering data, embodiments could be used in the context of numerous other applications. The given example is for the purposes of illustration only, and should not be construed as limiting the scope of the inventive subject matter in any way.

Various characteristics of a pixel bar chart are affected by various "attributes" of a set of data records, in an embodiment. Each of the data record set attributes corresponds to a field of the data records, in an embodiment. These data set attributes include, in an embodiment, one or more dividing ("D") attributes, one or more ordering ("O") attributes, and one or more visual indicator ("VI") attributes. In the description below, one dividing attribute, one ordering attribute, and one visual indicator attribute are specified. It should be understood that, in other embodiments, more dividing, visual indicator, and/or ordering attributes could be specified. As is described below, the dividing, visual indicator, and ordering attributes are assigned to various fields of a representative data record. These assignments may be fixed, or they may be changeable by a user of a pixel bar chart generation tool, in accordance with various embodiments.

In an embodiment, a pixel bar chart may formerly be defined by: <D, O, VI>, where D is a dividing attribute along a first direction, O is the intra-partition ordering attribute, and VI is the visual indicator attribute. Assume, for example, that the dividing attribute, D, corresponds to the "Product ID" field 224 of the set of data records in FIG. 2. Assume further that the ordering attribute, O, corresponds to "Total Sale" field 226, and that the visual indicator attribute, VI, also corresponds to "Total Sale" field 226. This example illustrates that the dividing, ordering, and visual indicator attributes may be assigned to the same or different fields.

The dividing attribute, D, is an attribute of the data that is used to partition the data records into disjoint groups corresponding to the bars. In an embodiment, a single dividing attribute is used, which determines to which bar a data record will be assigned. A dividing attribute may pertain to data represented by numeric values, alphanumeric values, and binary or other digital values. A pixel bar chart generated in accordance with the example attribute assignment scheme, above, may include at least three bars, because three distinct values exist within the dividing attribute's "Product ID" field 224 (i.e., "VCR07A," "DVD04C," and "FTV16").

The visual indicator attribute, VI, is an attribute of the data that is used to select an output visual indicator (e.g., color, pattern, etc.) for each pixel unit, where the output visual indicator represents the value of the attribute (e.g., a value within the "Total Sale" field 226). A visual indicator attribute may pertain to data represented by numeric values, alphanumeric values, and binary or other digital values. The term "visual indicator," as used herein, means a distinct pixel unit output, which is controllable using various combinations of red, green, and blue (RGB) sub-pixel intensities, or which is controllable using grey-scale pixel intensities.

As will be described in more detail later, pixel unit visual indicators are assigned according to the value of the corresponding data as it maps to a visual indicator scale. Said another way, a visual indicator assignment (e.g., a color, pattern, image, or other visual indicator assignment) represents one visual indicator value within a set of multiple, assignable visual indicator values of a visual indicator scale. A method for defining a visual indicator scale is described in more detail later in conjunction with FIG. 3.

The ordering attribute, O, is an attribute of the data that is used to arrange data records (represented by pixel units) within a bar. Accordingly, an ordering attribute determines the intra-partition (e.g., intra-bar) ordering of the data records, and thus the arrangement of pixel units with different visual indicators. In an embodiment, a single ordering attribute is used, which determines the order, within a bar, in which data records are represented by pixel units. An ordering attribute may pertain to data represented by numeric values, alphanumeric values, and binary or other digital values.

In an embodiment, ordering occurs from left-to-right and from bottom-to-top. Accordingly, a "lowest ordered" data record (or pixel unit) may be located at the lower left corner of a bar. Arranging then proceeds from left to right. When a pixel unit row is completely filled (i.e., all pixel units along the width of a pixel unit row are assigned to data records), then assigning data records to pixel units within the next row above the completed row commences at the left side and proceeds to the right, and so on, until all data records are assigned to pixel units. Data records allocated to a particular bar may be ordered from the smallest to the largest value within the attribute field (or from largest to smallest). In other embodiments, pixel unit assignments (i.e., bar filling) may start at a different location within the bar. In still other embodiments, intra-partition filling may proceed from right-to-left, and/or may alternate filling directions (i.e., zigzag), and/or may fill from top-to-bottom.

In an embodiment, if there are not enough data records to cause a top row (e.g., row 160, FIG. 1A) of a bar (e.g., bar 106) to be filled with assigned pixel units, padding pixel units are used to pad a remainder of the row. The padding pixel units may be assigned a visual indicator (represented by "X" in FIG. 1A). In an embodiment, the assigned visual indicator may be the same as the visual indicator assigned to the "highest ordered" data record. In other words, in the example of FIG. 1A, padding pixel unit 135 may be assigned a same visual indicator as pixel unit 134, which represents the highest ordered pixel unit. Accordingly, the visual indicator "X" may be the same as the visual indicator "E," in this case. Conversely, in bar 104, the highest ordered pixel unit displays a visual indicator "D." Accordingly, the visual indicator "X" for the padding pixels in bar 104 may be the same as the visual indicator "D." In an alternate embodiment, a visual indicator other than the visual indicator of the highest ordered data record may be chosen as a padding visual indicator. In still another alternate embodiment, an uncompleted top bar may perform no end-of-row padding process, and instead the area of unfilled pixel units may display a background color.

In an embodiment, one or more aggregated data values also may be displayed in conjunction with the pixel bar chart. For example, in FIG. 1A, aggregated sales data is displayed in an area 170 located above bars 102, 104, 106. This data may represent, for example, a sum or average of all of the "Total Sale" amounts for all of the data records allocated to a bar. It would be apparent to one of skill in the art, based on the description herein, that other types of aggregated data also could be displayed, and/or that more than one type of aggregated data could be displayed, and/or that the positions of the aggregated data displays could be elsewhere on the chart.

In FIG. 1A, the aggregated data bar 170 shows three example aggregated sales values: $15,266,012 corresponding to bar 102; $16,042,773 corresponding to bar 104; and $24,631,901 corresponding to bar 106. These example values were selected to further illustrate a distinguishing characteristic of an embodiment. This characteristic is that the height (e.g., height 124) of a bar indicates the volume of records represented, and not necessarily the aggregated value of data represented within a bar. Accordingly, even though a bar may include a pixel unit representing an exceptional value (e.g., pixel unit 134, bar 106), the height of the bar may not be skewed by the exceptional value. In the example illustrated in FIG. 1A, although the height of bar 106 is the lowest, its aggregated value is the highest, due to the exceptional value (pixel unit 134) represented within the bar 106.

Conversely, in a traditional bar chart, the height of a bar is proportional to the aggregated value of data represented within a bar. Therefore, in a traditional bar cart, the height of a bar may be skewed by one or more exceptional values.

Figure 1B:
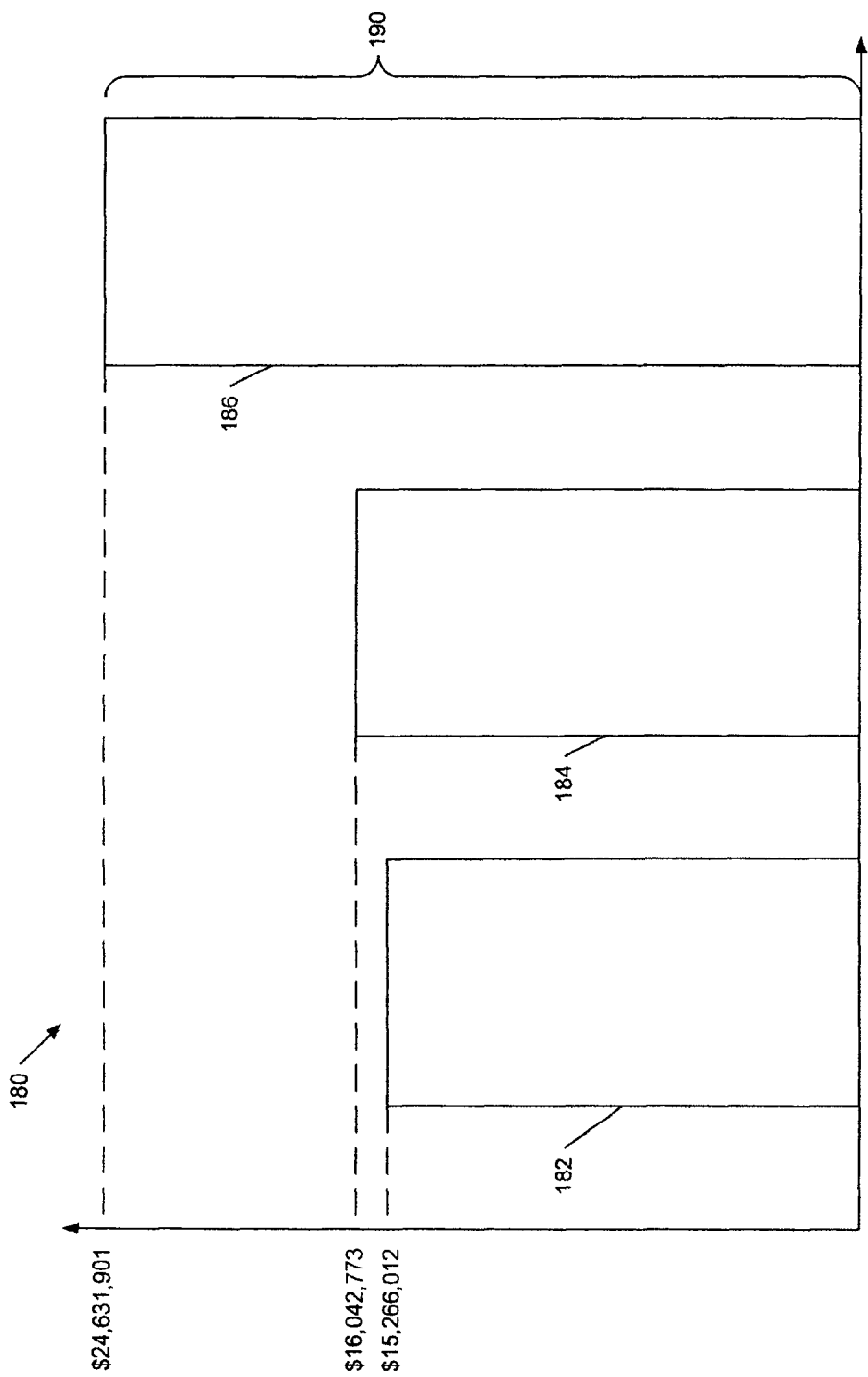
FIG. 1B is an example illustrating a traditional bar chart.

FIG. 1B is an example illustrating a traditional bar chart 180, which illustrates how an exceptional value may skew the height of a bar. Traditional bar chart 180 includes three bars 182, 184, 186. Assuming that bars 182, 184, 186 represent data having the same aggregated values as bars 102, 104, 106 (FIG. 1A), then the heights of bars 182, 184, 186 may appear as shown in FIG. 1B. Specifically, assuming that bar 186 represents data having an aggregated value of $24,631,901, the height 190 of bar 186 will be proportionally higher than the heights of bars 182 and 184. However, the aggregated value of $24,631,901 may have been significantly affected by one or more exceptional values, even though the rest of the values represented within the bar may have fallen within a more normal range. A person analyzing bar chart 180 may assume that the volume of records represented within bar 186 is higher than the volume of records represented within bars 182 and 184. Assuming that the same data is represented in the bars of FIG. 1B as the bars of FIG. 1A, this analysis would not be sufficient. Representing data in the manner depicted in FIG. 1B may lead an analyst to make inaccurate conclusions regarding the underlying data. The heights of the bars 182, 184, 186 in FIG. 1B represent the "total amounts" of the data values represented within the bars. Conversely, the heights of the bars 102, 104, 106 in FIG. 1A represent the number (i.e., volume) of data values represented within the bars. Important information, such as information concerning volume and exceptions, are not discernable from the bars 182, 184, 186 of FIG. 1B. For example, although bar 186 represents fewer records than are represented in bars 182 and 184, one exceptional high value represented within bar 186 results in bar 186 appearing substantially higher than bars 182 and 184.

A comparison of FIGS. 1A and 1B illustrates how a pixel bar chart, such as chart 100 (FIG. 1A) may more accurately and completely reflect multiple-attribute data represented within the chart, in accordance with various embodiments. More specifically, a pixel bar chart (e.g., chart 100, FIG. 1A) may not only represent the aggregated data (in bar 170, FIG. 1A), but may also indicate exceptions (e.g., through use of a distinguishing visual indicator, such as indicator "E" in pixel unit 134), in various embodiments. Further, unlike a traditional bar chart, a pixel bar chart may represent a volume of records represented, because the number of pixel units, and thus the height of a bar, is proportional to the number of records represented within a bar, in an embodiment. Further still, a pixel bar chart may indicate the data distribution for values represented within the bar, through the use of a scale of visual indicators that may be associated with the pixel units (e.g., a continuous color scale). As FIG. 1B illustrates, a traditional bar chart 180 may only represent an aggregated value as the height of a bar, and this aggregated value may not be sufficient to analyze the nature of the underlying data. As discussed previously, important information, such as volume, data distribution, and exceptions, are not reflected in a traditional bar chart.

Figure 3:
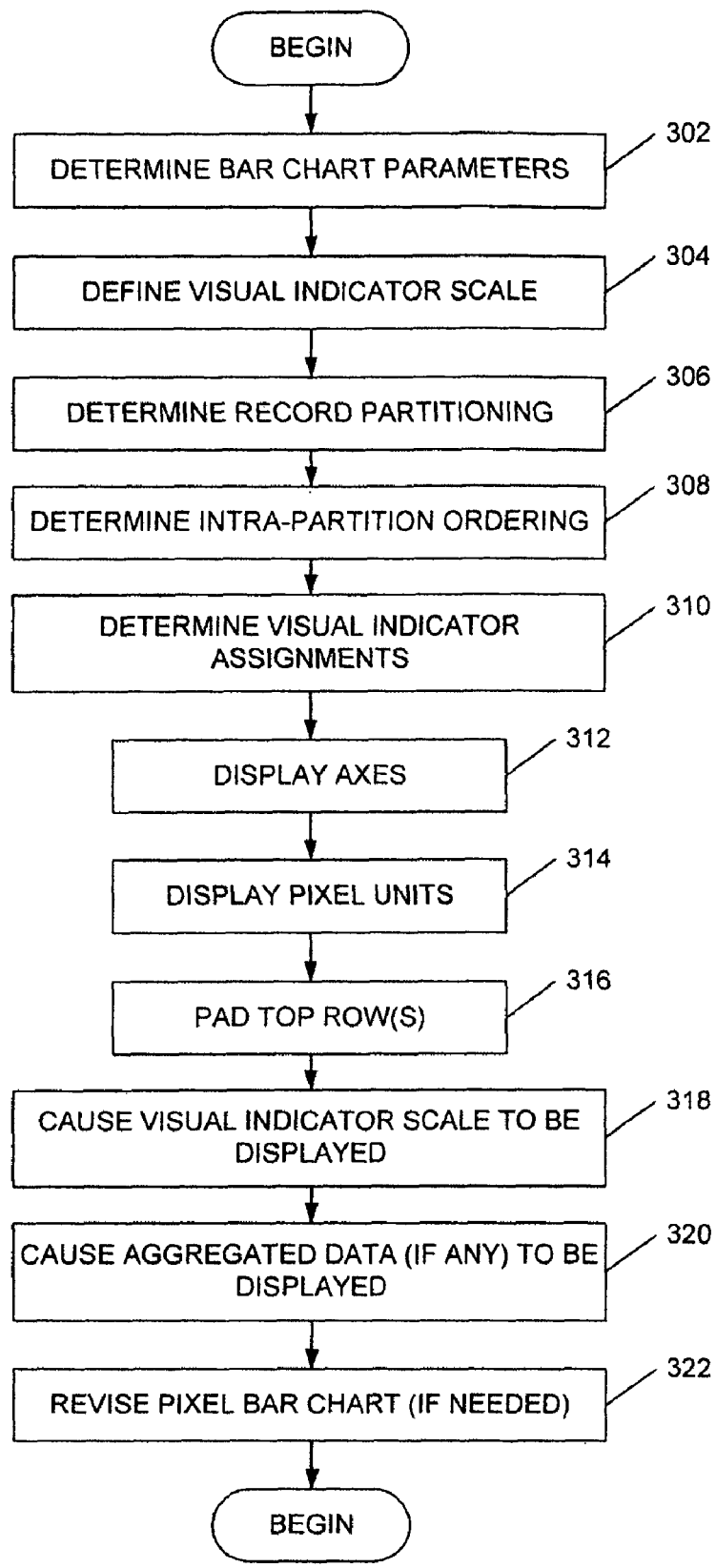
FIG. 3 is a flowchart of a procedure that initializes, constructs, and displays a pixel bar chart, in accordance with an embodiment.
Figure 4:
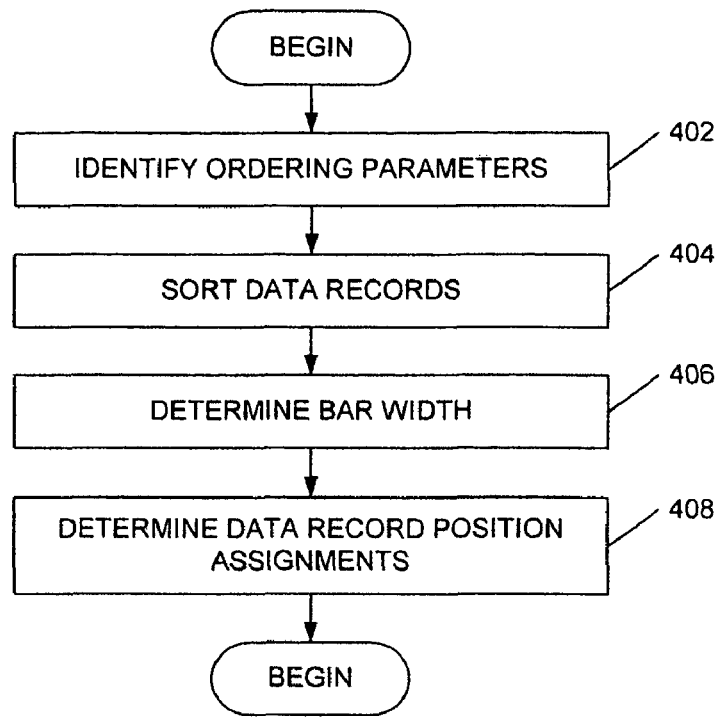
FIG. 4 is a flowchart of a procedure that determines intra-partition ordering, in accordance with an embodiment.

In FIGS. 3 and 4, various embodiments for constructing pixel bar charts are described in detail. FIG. 3 illustrates a high-level process for constructing a pixel bar chart, and FIG. 4 illustrates a lower-level process.

FIG. 3 is a flowchart of a procedure that initializes, constructs, and displays a pixel bar chart, in accordance with an embodiment. In an embodiment, all or portions of the procedure are carried out by a pixel bar chart generation tool, which may be a software application that is executable on a general-purpose or special-purpose computing device. As will be described further below, a pixel bar chart is constructed, which may include multiple bars with substantially equal widths and potentially variable heights. Each bar may include a number of pixel units corresponding to a volume of data records represented within the bar. Selected visual indicators are displayed within the pixel units of the bar, where a selected visual indicator represents a value of an attribute of a data record represented by the pixel unit.

The method begins, in block 302, by determining bar chart parameters. Bar chart parameters may include, for example:

1) identification of the set of data records being represented;

2) identification of the attributes used for partitioning (D), ordering (O), and assigning visual indicators (VI);

3) partitioning parameters (e.g., may define how many partitions will be displayed and/or the ranges or values assigned to each partition);

4) ordering parameters (i.e., indicating how ordering should proceed within a partition);

5) aggregated data display designations (e.g., what aggregated values, if any, are displayed (e.g., in area 170, FIG. 1A)); and 6) other bar chart parameters (e.g., bar width, horizontal and vertical scale ranges and/or range marking specifications, inter-bar spacing, etc.).

In other embodiments, more, fewer, and/or different bar chart parameters may be determined or indicated. In an embodiment, the pixel bar chart generation tool may prompt a user to specify some or all of the bar chart parameters. In another embodiment, the bar chart generation tool may retrieve stored values for some or all of the bar chart parameters from a computer-readable medium. In still another embodiment, the bar chart generation tool may calculate some or all of the bar chart parameters from other parameters, the input data, or other information.

In block 304, a visual indicator scale is defined. A visual representation of a visual indicator scale is illustrated in FIG. 1A as scale 150. A visual indicator scale may be represented by multiple assignable visual indicators (e.g., displayed along a scale bar), and each of the multiple assignable visual indicators may be defined to correspond to one or more visual indicator attribute values, in an embodiment. A visual indicator scale may be defined by some or all of the following parameters:

1) Number of and type of visual indicators (or number of sub-ranges). Visual indicator types may include, for example, RGB color definitions, grey-scale color definitions, pattern definitions, images, and the like. In various embodiments, visual indicators may be static or dynamic (e.g., flashing or moving patterns or images). In an embodiment, the number of visual indicators may be in a range of two visual indicators to hundreds of visual indicators (e.g., 256 RGB pixel colors). In the example of FIG. 1A, five visual indicators (A, B, C, D, and E) are defined.

2) Overall scale range. This defines the lowest and highest values represented within the range. In the example of FIG. 1A, the lowest value is illustrated as "VAL 1" and the highest value is illustrated as "VAL 6."

3) Sub-range corresponding data values. This parameter indicates which of one or more values are mappable to a sub-range. A specific value (or set of values) may be defined as mapping to a sub-range, or a range of values may be specified, or threshold values (i.e., values at transitions between visual indicators) may be defined. The number of sub-range thresholds may be related to the number of visual indicator parameters. There may be a one-to-one correlation between the number of sub-ranges and the number of visual indicators, for example. Such an example is illustrated in FIG. 1A, where five sub-ranges are illustrated. For example, a lowest sub-range is designated as mapping to values within a range between "VAL 1" and "VAL 2." In an embodiment, the sub-range data values (and/or the ranges or thresholds) that map to the sub-ranges for the visual indicator attribute may be specifically assigned by a user. If ranges are specified, the sub-range thresholds may occur in a linear manner over the entire range, or they may occur in a non-linear (e.g., logarithmic) or irregular manner. In an embodiment, the thresholds may automatically be determined by normalizing the values of the visual indicator attribute to a range of 0 to 1 (linearly or non-linearly) and then mapping the normalized visual indicator attribute range to the visual indicator range.

4) Sub-range/visual indicator mapping. Visual indicators may be mapped to sub-ranges according to a pre-defined ordering. For example, if six sub-ranges exist, the lowest sub-range to the highest sub-range may automatically be mapped in the order: red, orange, yellow, green, blue, violet. In an alternate embodiment, a user may specifically assign visual indicators to sub-ranges. For example, a user may be able to assign the visual indicator blue-green to the highest sub-range, and the visual indicator yellow to the lowest sub-range, and so on.

5) Scale marking granularity. This parameter enables the number of scale markings to be specified. For example, a scale marking could be displayed at each visual indicator threshold, or a scale marking could be displayed at the transitions between 10-indicator groups. In still another embodiment, a scale marking could indicate one or more values that map to a sub-range (e.g., Product "VCR07A" maps to a sub-range having the color red). In the example of FIG. 1A, six scale markings are illustrated (i.e., "VAL 1" to "VAL 6"), and a scale marking is displayed at each visual indicator threshold.

In an embodiment, the scale may be dynamically generated based on the incoming data. In another embodiment, the scale may be pre-defined. In still another embodiment, the pixel bar chart generation tool may prompt a user to specify some or all of the visual indicator scale parameters. For example, a user may be prompted to indicate whether to use RGB or greyscale colors, patterns or images, and also to indicate how many distinct visual indicators to include in the scale. In another embodiment, some or all of the visual indicator scale parameters are automatically determined by the tool. For example, the range and sub-ranges may automatically be determined based on the range of values present for the visual indicator attribute within the specified set of data records, and the number of visual indicators present in the visual indicator scale.

Blocks 306-316 pertain to creating one or more bars of a pixel bar chart as a function of the dividing, ordering, and visual indicator attributes of the data records being represented. In block 306, data record partitioning is determined according to the partitioning parameters (e.g., partition ranges or values) and the dividing attribute, D. In an embodiment, this includes assigning each data record to a partition (e.g., to a bar) according to the value of the dividing attribute for that data record. To determine a partition for a data record, the value within the record's dividing attribute is correlated with the partition values or the partition ranges. The data record is assigned a partition corresponding to the partition value or the partition range within which the dividing attribute value lies.

Using the example previously presented, and referring to FIG. 2, assume that the dividing attribute pertains to the "Product ID" field 224. Inspection of the values within this field indicates that three product designations are present: VCR07A; DVD04C; and FTV16. Assuming that no other empty-set product partitions are to be included in the pixel bar chart, the presence of three product values indicates that three bars may be included in the chart. The data records are partitioned into these three bars. Accordingly, the bar pertaining to VCR07A would include pixel units representing data records 201, 204, and 208. The bar pertaining to DVD04C would include pixel units representing data records 202, 203, 206, and 210. Finally, the bar pertaining to FTV16 would include pixel units representing data records 205, 207, and 209.

In block 308, intra-partition ordering is determined according to the ordering parameters and the selected ordering attribute, O. Intra-partition ordering defines the orders in which data records are represented within the bars. For example, within a bar, ordering may proceed from the lowest value for the ordering attribute to the highest value for the ordering attribute, from bottom-to-top, and from left-to-right. An embodiment for determining intra-partition ordering is described in more detail, later, in conjunction with FIG. 4.

In block 310, visual indicator assignments (i.e., pixel intensity assignments) are determined according to the selected visual indicator attribute, VI, and the visual indicator scale as determined in block 304. In an embodiment, the visual indicators (e.g., colors) selected and displayed within the pixel units of a bar indicate a data distribution for an attribute of data records represented by the pixel units of the bar. In addition, in an embodiment, a selected visual indicator may indicate an exceptional attribute value (e.g., "red" may indicate an extremely high (or low) value). To determine a visual indicator assignment for a particular data record, the value within the record's visual indicator attribute is correlated with the visual indicator scale's sub-range thresholds or values. The data record is assigned a visual indicator value corresponding to the visual indicator sub-range in which the data record's visual indicator attribute value lies.

Again using the example data record set of FIG. 2, assume that the visual indicator attribute pertains to the "Total Sale" field 226. Assume also that visual indicator sub-ranges are specified as follows: sub-range "A" is $0-$199.99; sub-range "B" is $200-$999.99; sub-range "C" is $1000-$9,999.99; sub-range "D" is $10,000-$39,999.99; and sub-range "E" is $40,000 or more. For this example, visual indicator "A" would be assigned to data records 201 and 203; visual indicator "B" would be assigned to data record 207; visual indicator "C" would be assigned to data records 202, 204, 205, and 206; visual indicator "D" would be assigned to data records 208 and 210; and visual indicator "E" would be assigned to data record 209.

Blocks 312-318 include processes for causing the pixel bar chart to be displayed on a display device, such as a computer monitor. Similar processes could be used to send messages to a printer for printing a pixel bar chart or to store an electronic version of a pixel bar chart. Although printing and storing are not discussed in detail, below, it would be apparent to one of skill in the art how to modify the process to produce a printed pixel bar chart or to store an electronic representation of a pixel bar chart, rather than displaying a pixel bar chart on a display device.

In block 312, one or more axes (e.g., axes 110, 112, FIG. 1A) are displayed. For example, the axes may include a horizontal axis and a vertical axis. In an embodiment, bar identifiers and/or horizontal axis range markings are displayed in conjunction with the horizontal axis. Similarly, vertical axis markings are displayed in conjunction with the vertical axis, in an embodiment. In alternate embodiments, either or both axes and/or their markings could be excluded from the display.

In block 314, pixel units are displayed in an arrangement within the bars, according to the partitioning determined in block 306, the ordering determined in block 308, and the visual indicator assignments determined in block 310. More specifically, the constituent display pixel(s) for a pixel unit are activated with intensities that correspond to the pixel visual indicators assigned for the data record that is to be represented by that pixel unit.

In block 316, any uncompleted pixel rows at the tops of the bars may be padded with one or more padding pixel units. For example, as previously discussed, a pixel row at the top of a bar (e.g., pixel row 160 at the top of bar 106, FIG. 1A) may not be completely filled with pixel units that correspond to data records. Accordingly, the remaining pixel unit spaces (e.g., space 135) may be padded by assigning them a selected visual indicator. In an embodiment, the padding visual indicator is selected as the visual indicator assigned to the highest-order pixel in the bar. In the given example, the padding visual indicator would be selected as visual indicator "E." In other embodiments, the remaining pixel unit spaces could display another visual indicator (e.g., so that unassigned pixel units can be discerned).

In block 318, the process causes a visual indicator scale (e.g., visual indicator scale 150, FIG. 1A) to be displayed, which is consistent with the visual indicator scale determined in block 304. In an embodiment, the visual indicator scale includes a scale bar (e.g., a vertical (as shown) or horizontal bar) that includes each of the assignable visual indicators, and one or more range and sub-range markings, which enable the visual indicator attribute values to be discerned for each sub-range. A visual indicator scale is displayed in proximity to the pixel bar chart, in an embodiment. For example, the visual indicator scale may be displayed to the right of the pixel bar chart (as illustrated in FIG. 1A), or alternatively to the left, above, below or within the pixel bar chart. In an embodiment, the visual indicator scale includes one or more markings that indicate visual indicator attribute values corresponding to one or more thresholds between adjacent visual indicators within the visual indicator scale. In another embodiment, the visual indicator scale includes one or more markings that indicate one or more visual indicator attribute values corresponding to a visual indicator within the visual indicator scale.

In block 320, the process causes aggregated data items (e.g., data 170, FIG. 1A) to be displayed, if any are specified. For example, a single aggregated data value may be displayed in proximity to each bar. Alternatively, multiple aggregated data values may be displayed in proximity to each bar, or aggregated data values that represent data aggregated across multiple bars may be displayed.

In an embodiment, a pixel bar chart may be displayed for a set of static data records. In another embodiment, a pixel bar chart may be displayed for a set of dynamic data records. In such an embodiment, any one or more of the dividing, visual indicator, and/or ordering attributes may change within a data record. In addition, data records may be added to or removed from the data record set being depicted. Accordingly, in block 322, the pixel bar chart may be periodically or aperiodically revised by repeating some or all of the aforementioned processes of FIG. 3. Updates may occur on a periodic basis (e.g., once per minute) or on an aperiodic basis (e.g., each time a dividing, visual indicator or ordering attribute crosses a threshold). Real-time, pixel bar chart revisions may continue for an indefinite amount of time. Eventually, the method ends when the pixel bar chart display is terminated.

FIG. 4 is a flowchart of a procedure that determines intra-partition ordering (e.g., block 308, FIG. 3), in accordance with an embodiment. The method begins by identifying the ordering parameters, in block 402. Ordering parameters may include, for example:

1) one or more indications of how ordering should proceed (e.g., from lowest ordering attribute value to highest ordering attribute value, or vice versa);

2) identification of an initial location (i.e., where to place the lowest-ordered data record); and 3) ordering directions (e.g., left-to-right, right-to-left, zigzag, top-to-bottom, bottom-to-top, etc.).

In an embodiment, ordering parameters are pre-defined. For example, pre-defined ordering parameters may specify that ordering is to proceed from lowest to highest value, starting at the lower left of a bar, and proceeding from left-to-right and bottom-to-top until the bar is filled. In another embodiment, one or more ordering parameters may be specified by a user.

The data records partitioned into a particular bar are then sorted, in block 404, according to the ordering parameter corresponding to how ordering should proceed (e.g., from lowest ordering attribute value to highest ordering attribute value). In an embodiment, only one ordering parameter is specified, and accordingly a one-dimensional sort is performed. In another embodiment, multiple ordering parameters may be specified, and accordingly a multi-dimensional sort may be performed. For example, a first ordering parameter may result in a sort according to an order quantity, and a second ordering parameter may result in a sort according to an order date. The data records would first be sorted according to order quantity, and where multiple records exist having the same quantity, the data records would be sorted according to order date.

In block 406, a bar width (e.g., width 120, FIG. 1A) is determined. In an embodiment, the bar width is represented as a number of pixel units that compose one row of the bar. For example, in FIG. 1A, six pixel units compose each row of each bar. More or fewer pixel units may define the width of a row. In an embodiment, the bar width is determined so that a minimum number of padding pixel units are included in the top rows of the bars. In other embodiments, other criteria may be used to determine the bar width.

For example, in an embodiment, the bar width may automatically be calculated depending on how many bars are present within the pixel bar chart. In another embodiment, the bar width may depend on bar chart parameters specified by a user. Other parameters may be used to determine bar width. In an embodiment, the bar width is substantially the same for all of the bars displayed. Accordingly, the number of pixel units within a row is substantially the same for all of the bars.

Data record position assignments are then determined, in block 408. In an embodiment, data record position assignments are specified using horizontal and vertical coordinates within a bar. A vertical coordinate may specify a row number and a horizontal coordinate may specify a column number. For example, coordinate 1:1 may indicate the pixel unit position corresponding to the first row and the first column within a bar (e.g., the lower left pixel unit location). Coordinate 3:6 may indicate the pixel unit position corresponding to the third row and the sixth column within the bar.

Data record position assignments proceed for the sorted data records in accordance with the identified initial position (e.g., position 1:1) and the ordering directions (e.g., left-to-right and bottom-to-top). Accordingly, using the example of FIG. 1A, the sorted data records would have their positions assigned in the following order (row:column): 1:1; 1:2; 1:3; 1:4; 1:5; 1:6. When the end of the row is reached, positioning may commence at the beginning of the next row up in the following order: 2:1; 2:2; 2:3; 2:4; 2:5; 2:6, and so on, until all of the sorted data is assigned to a position within the bar. Alternatively, if a zigzag ordering is specified, the sorted data records may sequentially be assigned from left-to-right in the bottom row, and from right-to-left in the next row up, and so on (i.e., 1:1; 1:2; 1:3; 1:4; 1:5; 1:6; 2:6; 2:5; 2:4; 2:3; 2:2; 2:1; 3:1; 3:2, . . . ). After position assignments have been made for all sorted records, the method ends.

In an embodiment, once a pixel bar chart is displayed, a user is able to initiate various "secondary actions" by selecting certain pixels. These secondary actions are selected from a group of actions that includes: 1) displaying one or more underlying data records; and 2) "zooming in" or enlarging a set of pixel units, in an embodiment.

In an embodiment, a secondary action is initiated when a user selects one or more "selectable pixel units" within a pixel bar chart. The term "selectable pixel unit" is used herein to mean a pixel unit that is selectable through user interaction (e.g., using a point and click mechanism, arrow keys, or the like). In an embodiment, a selectable pixel unit includes all display pixels within a pixel unit. In another embodiment, a selectable pixel unit includes a subset of the display pixels within a pixel unit. In an embodiment, all displayed pixel units are selectable pixel units. In another embodiment, fewer than all displayed pixel units are selectable pixel units. For example, padding pixel units may not be selectable pixel units. In another embodiment padding pixel units may be selectable, and when selected, may cause data from the highest ordered pixel unit (i.e., the pixel unit upon which a padding pixel is based) to be displayed.

Figure 5:
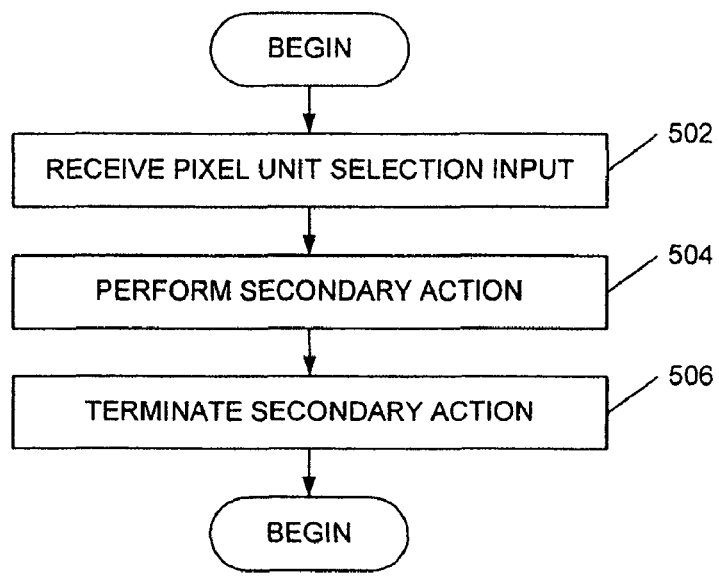
FIG. 5 is a flowchart of a procedure that performs a secondary action in response to a user selection of one or more pixel units, in accordance with an embodiment.

FIG. 5 is a flowchart of a procedure that performs a secondary action in response to a user selection of one or more selectable pixel units, in accordance with an embodiment. The method begins, in block 502, by receiving an input indicating that a user has made a selection of one or more selectable pixel units. For example, to select a single selectable pixel unit, a user may move a mouse over a selectable pixel unit and "click." Alternatively, a user may move a mouse over a selectable pixel unit and allow the mouse to remain over the icon for a selection time period (e.g., ½ second). To select multiple selectable pixel units, a user may click and drag a selection box over a set of icons, or may click on several icons while holding down the "shift" key, for example. Other ways of selecting one or more selectable pixel units would be apparent to those of skill in the art, based on the description herein.

In block 504, a secondary action is performed in response to the selecting process of block 502. A secondary action may include, for example, displaying all or portions of the detailed data record for a selected pixel unit. In an embodiment, a selected detailed record is overlaid on the pixel bar chart (e.g., in proximity to the selected icon). In another embodiment, a window or screen that includes the detailed record may be opened separately from a window or screen that includes the pixel bar chart.

Figure 6:
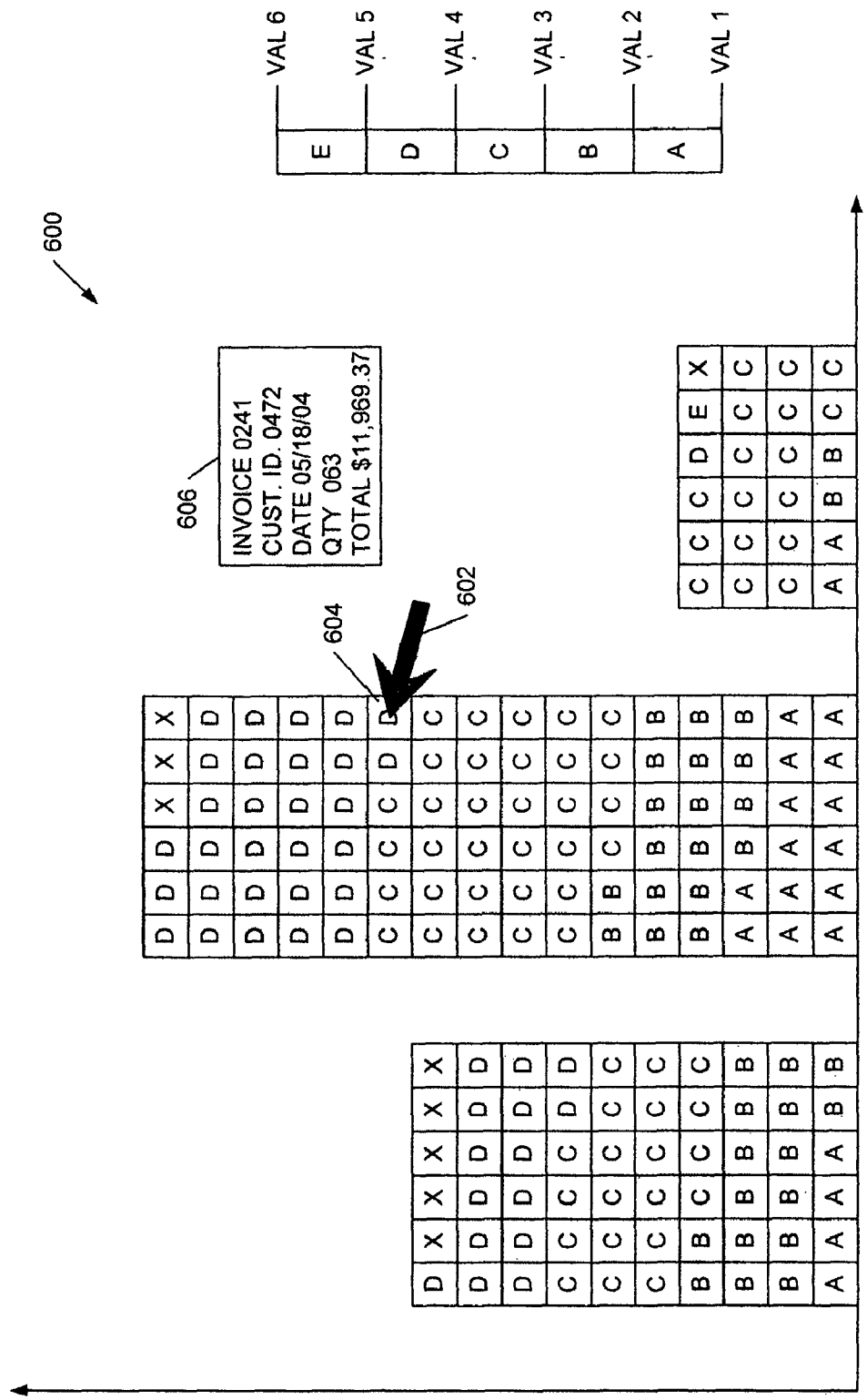
FIG. 6 is an example illustrating a detail record display feature implemented in conjunction with a pixel bar chart, in accordance with an embodiment.

FIG. 6 is an example illustrating a detail record display feature implemented in conjunction with a pixel bar chart 600, in accordance with an embodiment. A mouse cursor 602 may be moved across the pixel bar chart 600 in response to mouse movements provided by a user, in an embodiment. If the user clicks on a particular selectable pixel unit (e.g., icon 604) (or waits a specified period of time), then a detailed record 606 may be displayed in proximity to the selectable pixel unit (or elsewhere on the screen or in another window). In an embodiment, the detailed record 606 includes values within some or all of the fields of the detailed record assigned to the selectable pixel unit.

A secondary action may alternatively include, for example, displaying all or portions of detailed data records for multiple selected pixel units. In an embodiment, the multiple, selected detailed records are overlaid on the pixel bar chart (e.g., in proximity to the selected icons). In another embodiment, a window or screen that includes the detailed records may be opened separately from a window or screen that includes the pixel bar chart. Detailed record information may be displayed distinctly for each selectable pixel unit, when several are selected, or aggregated detailed record information may be displayed for the selected pixel units.

Figure 7:
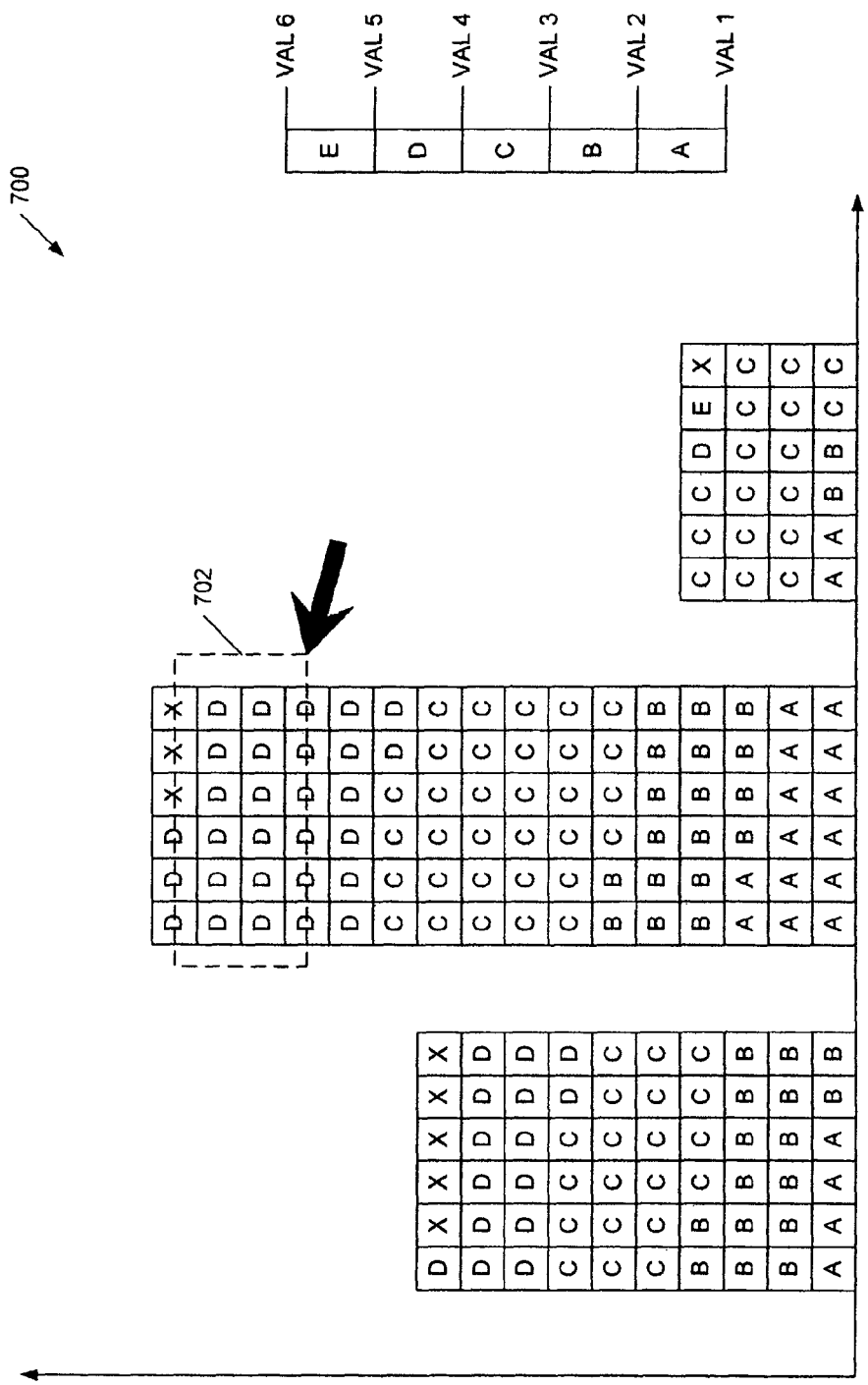
FIG. 7 is an example illustrating selection of multiple selectable pixel units implemented in conjunction with a pixel bar chart, in accordance with an embodiment.

FIG. 7 is an example illustrating selection of multiple selectable pixel units implemented in conjunction with a pixel bar chart 700, in accordance with an embodiment. To select multiple selectable pixel units, a user may click and drag a selection box 702 over a set of icons (e.g., the icons located entirely or partially within selection box 702). After the selection occurs, a secondary action may be performed, such as displaying detailed data records.

In another embodiment, a secondary action may include "zooming-in" on a portion of a pixel bar chart. In such an embodiment, a user may select multiple selectable pixel units, as described above, and a new pixel bar chart that includes the selected pixel units may be generated in the same window as the first bar chart or in a new window.

Referring back to FIG. 5, in block 506, a secondary action that has been initiated may be terminated. In an embodiment, termination of the secondary action occurs in response to receiving a second user input. For example, a user may move the mouse off of the previously selected pixel and click on a background area to cause a displayed detailed record to disappear. Alternatively, a user may exit a window that includes the information pertaining to the secondary action. In still another embodiment, the secondary action may terminate automatically upon expiration of a time period or upon the occurrence of some other event. After terminating the secondary action, the method ends.

Other features may additionally or alternatively be included in methods of constructing a pixel bar chart, in various embodiments. For example, in an embodiment, user prompts and inputs are provided that enable a user to control the ordering of bars as they are displayed. For example, a user may specify that the bars should be sorted in ascending or descending order, based on volume (e.g., the number of pixel units within a bar) or based on another parameter (e.g., an average or total of an attribute represented within a bar). In still another embodiment, user prompts and inputs are provided that enable a user to resize a pixel bar chart (e.g., to change the scale of the chart) to suit the user's preferences.

Embodiments of the inventive subject matter may be implemented in any of a number of electronic systems. For example, embodiments may be implemented in a desktop or laptop personal computer. Embodiments may further be implemented in a client/server environment, where portions of the processes are performed on a client computer and portions of the process are performed on a server computer. Embodiments also may be implemented on other electronic devices, including but not limited to printers, copier machines, television systems, personal data assistants, portable or stationary communication devices, projection equipment, and many others. A system in which an embodiment is implemented is referred to generally herein as a "graphical production system."

Figure 8:
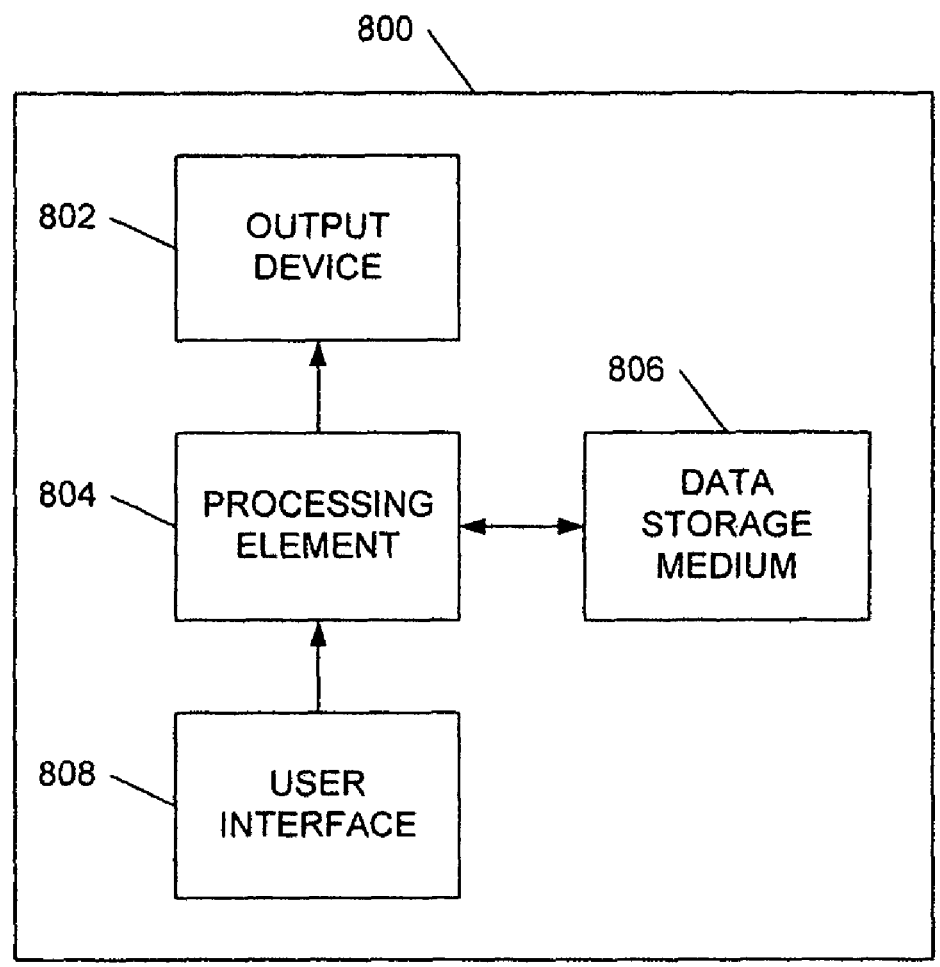
FIG. 8 is a block diagram of a graphical production system, in accordance with an embodiment.

FIG. 8 is a block diagram of a graphical production system 800, in accordance with an embodiment. System 800 includes an output device 802, one or more processing elements 804, one or more data storage media 806, and a user interface 808, in an embodiment. In an embodiment, system 800 may also include one or more network interfaces (not illustrated), which enable system 800 to send information to and/or receive information from a remote computing device that may store data records, parameters, and/or other information, and/or that may perform portions of the embodiments.

Output device 802 may include, for example, a display screen such as a computer monitor or screen. Pixel bar charts in accordance with various embodiments may be displayed on the display screen in response to control inputs provided by processing element(s) 804. As mentioned previously, pixel bar charts may alternatively be printed or stored in an electronic format, as a result of information produced by processing element(s) 804. In such embodiments, the output device 802 for the pixel bar chart would be a printer or a storage medium, rather than a display screen. Other types of output devices also may be implemented in a system, in other embodiments.

Processing element 804 may execute computer program instructions that carry out the processes of various embodiments. Processing element 804 may fetch the instructions from local or remote storage media, and execute them in an appropriate sequence. Processing element 804 may further retrieve and store data, parameters, and control information that enable processing element 804 to carry out the various embodiments.

Processing element 804 may also send and receive messages, via an interface, to another local or remote processing element (not illustrated) that may carry out portions of the methods. Further, processing element 804 may receive and process user input indications received from user interface 808. User interface 808 may include, for example, a mouse and/or other point-and-click mechanism, a keyboard, a microphone, a speaker, and/or other devices.

Storage media 806 may include, for example, volatile or non-volatile computer-readable media, including but not limited to, one or more hard disks, removable magnetic disks, removable optical disks, magnetic cassettes, flash memory cards, digital video disks, Bernoulli cartridges, random access memories (RAMs), read only memories (ROMs), and the like.

An example application of various embodiments has been described herein, which includes creating pixel bar charts to visualize information regarding received orders. Various embodiments may be applied for numerous other types of applications, as well. For example, but not by way of limitation, embodiments could be used in the context of creating pixel bar charts to analyze information regarding calls being handled at a call center, to analyze information pertaining to e-commerce sales transactions, to analyze client and/or server response times, and so on.

The various procedures described herein can be implemented in hardware, firmware or software. A software implementation could use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, flash memory cards, digital video disks, Bernoulli cartridges, RAMs, ROMs, and the like.

Although the Figures illustrate various processes as occurring in specific sequences, it would be apparent to one of skill in the art that the orders of the process blocks could be modified while still achieving the same results. Accordingly, modifications in the sequences of processing blocks are intended to fall within the scope of the inventive subject matter.

Thus, various embodiments of a method, apparatus, and system have been described which enable multiple-attribute data to be represented in a pixel bar chart. The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. For example, although embodiments have been described in conjunction with pixel bar charts, other embodiments may be applied to charts having other types of partitions besides bars (e.g., pie charts). For another example, although pixel bar charts having vertical bars (i.e., bars that extend upward from the horizontal axis) are described, other embodiments may depict pixel bar charts having horizontal bars (i.e., bars that extend horizontally from the vertical axis), and/or pixel bar charts may be generated having bar portions above and/or below the horizontal axis (or to the left and right of the vertical axis). For example, a pixel bar chart according to an embodiment may include pixel units corresponding to positive values displayed above a zero line, and pixel units corresponding to negative values displayed below the zero line. Other display styles that are used with traditional bar charts may be included in other embodiments, as well.

The phraseology or terminology employed herein is for the purpose of description and not of limitation. Accordingly, the inventive subject matter embraces all such alternatives, modifications, equivalents and variations as fall within the spirit and broad scope of the appended claims.

What is claimed is:

1. A non-transitory computer-readable storage medium having program instructions stored thereon that when executed within a graphical production system cause one or more processing elements to perform:
   determining a visual indicator assignment for a data record of a set of multiple data records based on a visual indicator attribute value of the data record, wherein the visual indicator assignment represents one visual indicator within a set of multiple, assignable visual indicators, and each visual indicator is mappable to one or more visual indicator attribute values;
   causing a pixel unit of a pixel bar chart to be displayed within a bar, wherein the pixel unit corresponds to the data record, and one or more display screen pixels associated with the pixel unit are activated according to the visual indicator assignment, wherein each pixel unit corresponds to a value of a data record;
   causing the pixel bar chart to be output on a display device;
   filling an uncompleted row of the bar with one or more padding pixel units; and
   selecting a width of the bar to achieve reduction in a number of the padding pixel units.

2. The non-transitory computer-readable storage medium of claim 1, wherein the program instructions when executed cause the one or more processing elements to further:
   provide plural bars in the pixel bar chart, wherein the plural bars are of equal width and the plural bars contain corresponding groups of pixel units.

* * * * *

UNITED STATES PATENT AND TRADEMARK OFFICE
CERTIFICATE OF CORRECTION

| | | |
|---|---|---|
| PATENT NO. | : 7,932,906 B2 | Page 1 of 1 |
| APPLICATION NO. | : 10/941114 | |
| DATED | : April 26, 2011 | |
| INVENTOR(S) | : Ming C. Hao et al. | |

It is certified that error appears in the above-identified patent and that said Letters Patent is hereby corrected as shown below:

On the Cover page, item (73), Assignee, in column 1, line 2, delete "L.P..," and insert -- L.P., --, therefor.

Signed and Sealed this
Twenty-seventh Day of September, 2011

David J. Kappos
*Director of the United States Patent and Trademark Office*